May 17, 1938.  J. L. McWEENY  2,117,442

INDICATING AND CONTROL APPARATUS

Filed Dec. 8, 1936

Inventor:
John L. McWeeny
By Foorman L. Mueller
atty

Patented May 17, 1938

2,117,442

UNITED STATES PATENT OFFICE 2,117,442

INDICATING AND CONTROL APPARATUS

John L. McWeeny, Chicago, Ill., assignor to Belmont Radio Corporation, Chicago, Ill., a corporation of Illinois Application December 8, 1936, Serial No. 114,804

3 Claims. (Cl. 116—124.4)

My invention relates in general to indicating and control apparatus, and more in particular to a color filter for use with indicating apparatus upon which indicating figures of different colors are printed, and which color filter is used to blot out or filter the indicating figures of the same color as the filter, to more strikingly designate the indicating figures of another color, which then stand out more prominently on the apparatus.

On indicating apparatus in general, and particularly on that for tuning indication on a radio receiver, a number of different indicating scales or tuning frequency band scales are shown on a dial, and the control apparatus operating with the indicating apparatus, may be selectively operated in connection with one indicating scale at a time. Indicating means are now employed for designating at the end of an indicating scale on the dial, that particular scale being utilized, and likewise, pointers of various lengths are employed to particularly point out the indicating or tuning frequency range or scale for the control apparatus in operation. However, with this type of designation, all of the indicating figures still remain in full view, just as prominently as the particular scale being utilized.

It is an object of my invention to provide an improved method and apparatus for designating which one of two or more indicating scales are being utilized in indicating apparatus employed in combination with control apparatus.

A further object of my invention is to accomplish the emphasis of a desired indicating scale by a simple and inexpensive apparatus as well as apparatus which has a pleasing and a noval appearance.

A still further object of the invention is to provide indicating apparatus for use in combination with control apparatus, which is readily visible with or without special lighting therefor.

One of the features of the invention is the provision of a variable color filter movable in front of a dial structure having a plurality of indicating figures thereon, printed or otherwise mounted on the dial in a variety of colors corresponding to the color filter. With the dial and filter operated so that the color filter blots out or filters out the indicating figures of the same color as the particular filter section standing in front of the dial, the remaining sets of colored indicating figures which remain visible stand out more prominently on the dial.

A still further feature of my invention is the provision of a color filter for a radio dial, which has such novelty as to greatly increase the sales appeal of the radio receiver upon which the invention is employed, and has such utility that improved tuning of the radio receiver is provided by the use of the apparatus.

Another feature of the invention is the provision of a color filter and an indicating dial in combination, with the color filter operative and the dial properly visible with the light source for the dial either in front of the color filter or behind the dial.

Other objects and features of the invention will be apparent from the following description, taken with the drawing, in which.

Figure 1:
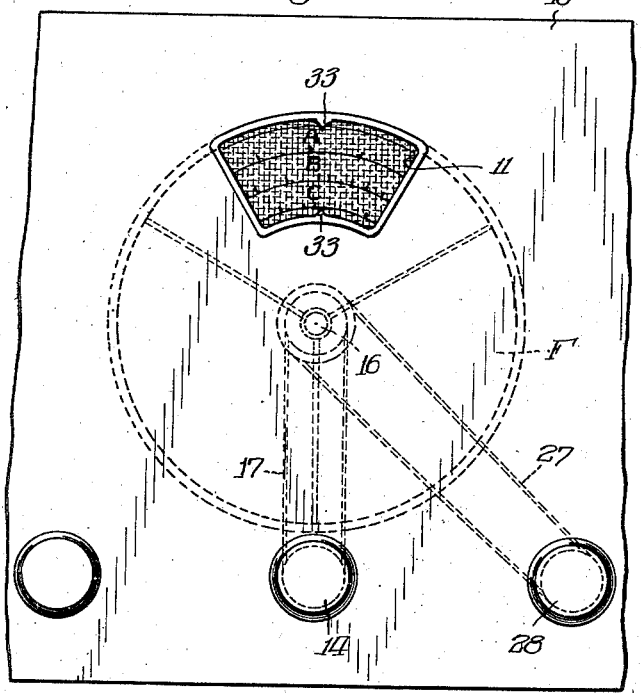
Fig. 1 is a fragmentary front elevation of a radio receiver, illustrating particularly the control and indicating apparatus for the same.

In practicing the invention, an indicating dial is employed with a plurality of different indicating scales shown in different colored figures upon the dial, and a movable color filter having a plurality of different colored filter sections mounted in front of the dial, to be selectively moved so as to obscure or filter out the figures in one or more indicating scales, while the figures of the other indicating scales remain visible to the operator of the control apparatus operating in conjunction with the indicating apparatus.

In the illustrated embodiment of the invention, indicating and control apparatus is mounted in a radio receiver including a cabinet 10 with a front wall having a viewing aperture 11 therein, through which is visible a dial 12 rotatable upon the rotation of a tuning condenser 13 operated by a tuning knob 14 in front of the cabinet. The dial 12 may be mounted directly on the condenser shaft 16 which is driven by a pulley 17 from the shaft of the control knob 14. It is of course understood that the rotation of the dial and condenser may be accomplished in any other well known manner, and it is also understood that the invention may be practiced with a stationary dial and movable color filter.

Although quite a variety of tuning ranges and tuning characteristics are indicated on radio dials, for purposes of illustration we may refer to simply three tuning frequency scales indicated generally by the figures A, B and C on the dial 12, as shown in Figs. 1, and 3 to 5, with the letter A designating a short wave band, the letter B the medium or broadcast band, and the letter C the long wave band. An appropriate wave band switch 18 may be operated in conjunction with the color filter, as will be hereinafter described, so that the radio receiver may be tuned on the particular wave band desired.

Figure 3:
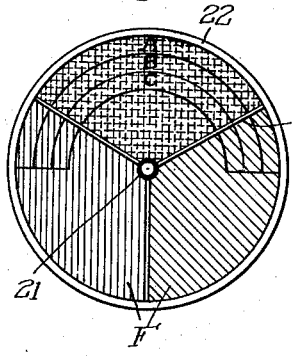
Figs. 3, 4 and 5 show color filters and dials in combination, and illustrate the manner in which indicating figures are visible or invisible depending upon the colors of the figures themselves and the color of the filter in front of the same.
Figure 4:
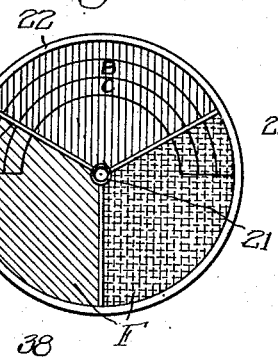
Figure 5:
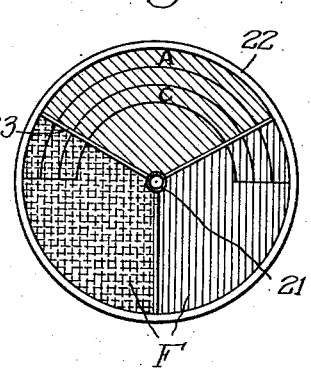

Color filtration is employed so as to make the particular wave band scale being utilized in tuning the radio receiver particularly prominent, and in accomplishing this a color filter member 19 may be provided in a circular frame having a plurality of color sections corresponding to the number of colors employed in designating the different wave band scales A, B and C. The color filter frame includes a center mounting plate 21 and an outer rim 22, with radially disposed arms 23 extending from the center to the rim for supporting the rim as well as dividing up the frame to carry a plurality of colored filter sections F, as shown particularly in Figs. 3 to 5. Three different sections are shown in Figs. 3 to 5, and in each section a colored filter F made of some transparent cellulose product, glass, or in fact any colored transparent material, is mounted within the arms 23 and rim 22 of the frame. The frame may be mounted upon a sleeve 26 rotatable upon the condenser shaft 16 but movable entirely independent of the shaft by means of a pulley 27 driving from a control knob 28 to a pulley 29 on the sleeve 26. As may be seen in Fig. 2, the wave band switch 18 is operated upon operation of the filter control knob 28 and a filter section corresponding to the particular wave band desired is positioned in front of the dial.

For purposes of illustration, the tuning scale A is considered as printed in red letters, the tuning scale B in green letters, and the tuning scale C in blue, or, if desired, in black figures. The operator of the receiver may be instructed to the effect that with all of the scales visible, the set is being tuned on the short wave band, indicated by the top scale A, and to make all of the scales visible, a tan or neutral filter, as shown in Fig. 3, is employed. When it is desired to tune the radio receiver in the broadcast band, the knob 28 may be turned to switch the receiver to the broadcast band and to move the filter 19 so that a red color section F, as shown in Fig. 4, covers the dial at the viewing aperture 11. This filters or blots out the top scale A printed in red, so as to make a blank space above the broadcast band scale B, and thus emphasize this scale.

Following out this type of emphasis or indication for the particular band being tuned, as the operator may be appropriately instructed, a green filter section F is mounted in the frame so that it will be positioned in front of the viewing aperture 11 when it is desired to tune in the long wave band which is indicated by the scale C. The green filter blots out the green figures in scale B and leaves a blank space at that scale, which emphasizes the scale below it or the long wave band C. If desired, black circular lines may be employed between the different scales, so as to more clearly emphasize a blank space as described above, for the black lines will be visible through each of the color filters mentioned. In Figs. 4 and 5, showing the red scale and green scale respectively, blotted out, the other two scales, being printed in different colors, are of course visible.

If desired, the scale below instead of above that which is being tuned can be filtered or blotted out, to particularly point out such tuning scale, but with each scale of a different color, no more than one scale at a time can be filtered out by the filter section in front of the same.

Figure 2:
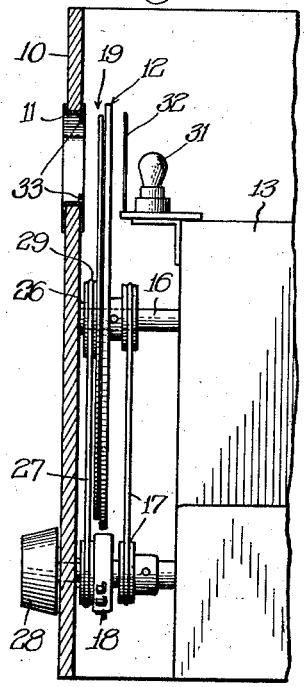
Fig. 2 is a side elevation partly in section, of the structure of Fig. 1.

Although I contemplate the use of my invention in a receiver without, as well as with, a pilot light, a pilot light assembly is illustrated in Fig. 2. This includes a pilot light 31 mounted to the rear of a stationary pointer 32 so as to shine through a translucent dial 12, casting a shadow of the pointer 32 thereon. The figures on the translucent dial are also clearly visible through the color filter, however, to the observer in front of the radio receiver when the set is turned off, and consequently the pilot light turned out. Under these conditions the light from the room shines through the filter to the dial rather than through the dial first, as in the case when the pilot light is on.

When using the invention without a pilot light, pointers 33 from the top and bottom of the escutcheon plate around the viewing aperture 11 indicate the tuned station. It is also understood that a wire stretching from the top to the bottom of the opening or any other similar apparatus may be employed for indicating the position of the tuned station on the dial.

Figure 6:
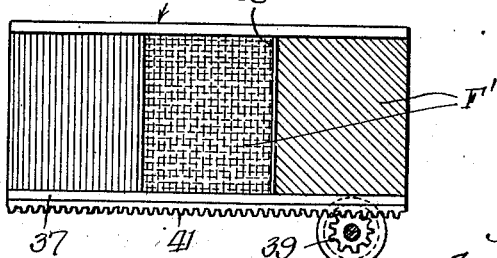
Fig. 6 is a modification of the invention as to the color filter itself.

A modification of the invention is illustrated in Fig. 6, in which a rectangular frame 36, including an outside rim 37 and vertical supporting arms 38 carry the individual filter sections F'. The frame 36 is moved longitudinally across the viewing aperture for looking at the dial by means of a rack and pinion assembly including pinion 39 and rack 41, with the pinion 39 rotated by the knob 28 in the manner heretofore described. The structure of Fig. 6 is shown in miniature size, and it is understood that each section of color filter F' is of a size sufficient to cover up the viewing aperture 11 or in fact the entire dial if the entire dial is ordinarily visible, so as to filter out the indicating figures in the manner of the color filter in the embodiments of Figs. 3 to 5.

There are several possible modifications of this invention which would utilize its principles in a slightly different way. For example, if the background were black instead of white as contemplated in the foregoing description and the scales shown in white, green and red, a green filter would leave the green scale visible instead of making it invisible and would make the red scale appear black and thus invisible against the black background. In other words, the green filter would not interfere with the green light from the green scale and would not change the appearance of the black background so the green would remain visible, while the green filter would absorb or otherwise prevent passage of the red light from the red scale and hence it would appear as black as the black background and would be indistinguishable thereon.

I claim:

1. Indicating apparatus for a radio receiver including a translucent dial having at least two scales each of a different color thereon, a light source at the rear of the dial, and a color filter in front of the dial and intermediate the dial and an observer having at least two transparent colored sections with each said section colored to correspond with one of the scale colors, means for supporting said colored sections comprising a movable frame having a rim thereon and intermediate supporting arms, and means for causing the dial scales to lie behind the color filter in a manner to make one of said colored scales relatively more visible than another to the observer.

2. Indicating apparatus for a radio receiver including a translucent dial having a plurality of concentric scales thereon with adjacent scales being of a different color, a light source at the rear of the dial, and a multi-section color filter rotatably mounted in front of said dial with each section of such a color as to filter out at least one colored scale, and a frame for said color filter including a circular rim and a plurality of radial arms extending from the center of the frame to the rim to divide the frame into sections corresponding to the number of filter sections.

3. Indicating apparatus for a radio receiver including a translucent dial having a plurality of tuning scales thereon with adjacent scales being of a different color, a light source at the rear of the dial for transmitting light therethrough, and means in front of said dial for causing one scale on said dial to stand out more prominently than an adjacent scale to the eye of an observer in front of said dial, said means comprising a substantially rectangular frame with transverse cross bars having a plurality of transparent color-filter sections supported on said frame, and means for moving said frame longitudinally across said dial in front thereof to position one of the color-filter sections in front of the dial.

JOHN L. McWEENY.